United States Patent [19]

Park et al.

[11] Patent Number: 4,928,197
[45] Date of Patent: May 22, 1990

[54] LOCK FOR VIDEO TAPE CASSETTE

[75] Inventors: Won B. Park; Ju Y. Oh, both of Cheon-An, Rep. of Korea

[73] Assignee: SKC Limited, Kyongki, Rep. of Korea

[21] Appl. No.: 140,544

[22] Filed: Jan. 4, 1988

[30] Foreign Application Priority Data

Sep. 29, 1987 [KR] Rep. of Korea .............. 87-16528[U]

[51] Int. Cl.⁵ .......................................... G11B 23/087
[52] U.S. Cl. .................................................. 360/132
[58] Field of Search ................. 360/132; 242/147-199

[56] References Cited

U.S. PATENT DOCUMENTS 4,712,150 12/1987 Pertzsch et al. .................... 360/132

Primary Examiner—John H. Wolff
Attorney, Agent, or Firm—Darby & Darby

[57] ABSTRACT

A lock for a video tape cassette is disclosed having a base plate on which a release button, a locking protrusion and a spring pole are provided. The spring pole is integral with and extends from the base plate. The spring pole has a free end provided with an abutment.

6 Claims, 2 Drawing Sheets

LOCK FOR VIDEO TAPE CASSETTE

FIELD OF THE INVENTION

The present invention relates to a lock for a video tape cassette, particularly to an improvement of the lock used in opening and closing the cap of the video tape cassette.

BACKGROUND OF THE INVENTION

The conventional lock for a video tape cassette has a complicated constitution as shown in FIG. 5. A base plate 4 is provided with a lock-releasing button 1 and a locking protrusion 1', which are inserted into a hole 2' formed in the side wall 2 of the cassette and into a locking hole 3' formed in the inner face of a cap 3 respectively. The base plate 4 is also provided with two shafts 5 which are respectively inserted into shaft holes 6 formed in the side wall. Further, there is installed a separate torsion spring 7 at one of the shafts 5 in order to provide elastic movements to the base plate 4. The use of such a separate torsion spring 7 necessitates the provision of spring protection ribs 9, 9'. Thus, the construction of the conventional lock mechanism is very complicated, and the expense incurred for procuring and assembling the separate steel torsion spring significantly increases the total cost of the cassette.

SUMMARY OF THE INVENTION

In order to overcome the above-described disadvantages, the present invention provides a spring pole integrally formed with a base plate. This eliminates the need for a separate steel torsion spring. Further, because of the elimination of the separate torsion spring, the related portions within the cassette are simplified. For example, the ribs for accommodation of the separate torsion spring are not required. Further manual assembly is made simpler, and assembly by robots is also made possible. Therefore, a cheap and good quality video tape cassette can be manufactured through the use of the device of the present invention.

BRIEF DESCRIPTION OF THE DRAWINGS

FIG. 6 is an exploded perspective view of a lower half member of the video cassette of FIG. 1 showing insertion of the lock of FIG. 4.

DESCRIPTION OF THE PREFERRED EMBODIMENT

Figure 1:
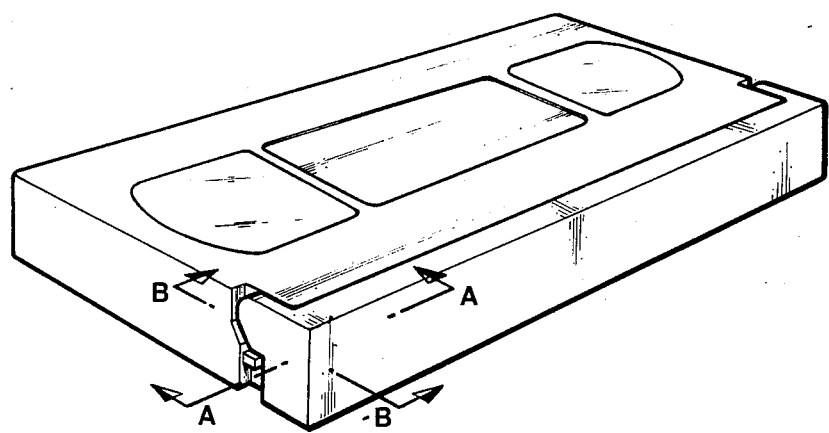
FIG. 1 is a perspective view of a video tape cassette.
Figure 2:
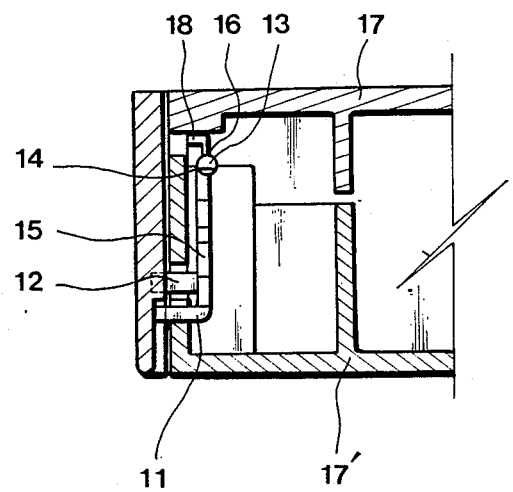
FIG. 2 is a cross sectional view of the assembled lock of the present invention taken along the line 2—2.
Figure 3:
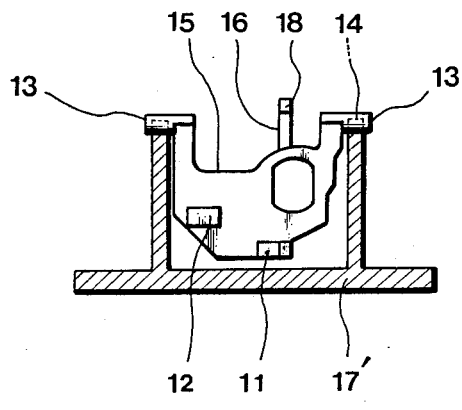
FIG. 3 is a cross sectional view of the assembled lock taken along the line 3—3.
Figure 4:
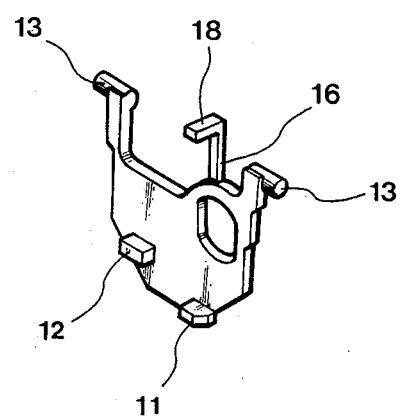
FIG. 4 is a perspective view of the lock of the present invention.
Figure 5:
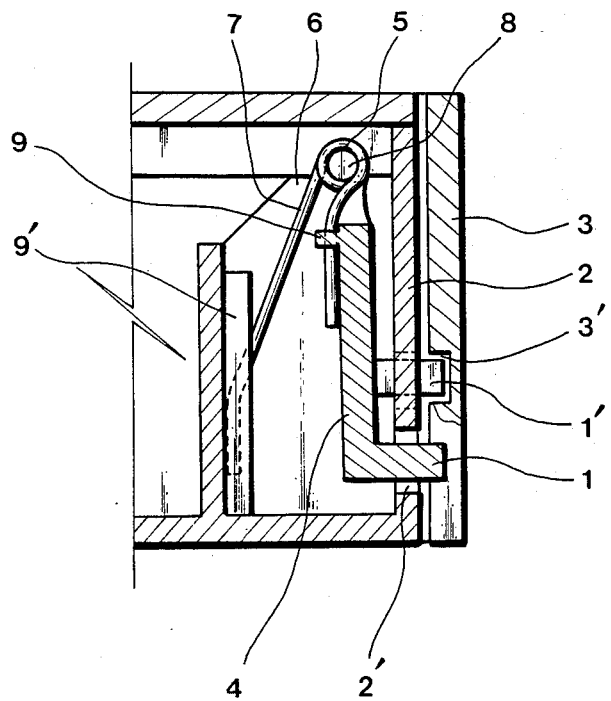
FIG. 5 is a cross sectional view of the conventional lock.

The above-described advantages of the present invention will become more apparent by describing in more detail the preferred embodiment of the present invention with reference to the attached drawings.

A base plate 15 is provided with a release button 11 and locking protrusion 12. The base plate 15 is further provided with supporting shafts 13 at the opposite upper sides thereof in order to suspend the base plate 15 by mounting the shafts 13 into shaft-receiving slots 14 which are formed on the side walls. At the upper side of the base plate 15 and aligned with the axis of the supporting shafts 13, there is provided a spring pole 16 (an upstanding rod spring). The end portion of the spring pole 16 is rectangularly bent forming an abutment portion 18 which is to be abutted with the ceiling of the upper half member 17.

According the device of the present invention, the spring pole 16 and the abutment portion 18 are integrally formed with the base plate 15, eliminating the need for using a separate torsion spring and thereby making the construction of the lock simpler. There fore, not only is manufacturing easier, but also assembly is extremely simpler, as will be described herein below. Minimal arrangement is needed, and all other formations which accompany the torsion spring in the conventional cassette are eliminated, thereby achieving a simpler locking mechanism.

The assembly process requires mounting the supporting shafts 13 into the shaft-receiving slots 14 formed in the side walls of the lower half member 17', (see FIG. 6), and then shutting down the upper half member. This shortens the assembly time in the case of manual assembly, and enables assembly by robots. The upper face of the abutment portion 18 is abutted onto the ceiling of the upper half member 17 of the cassette, while the tip face of the abutment portion 18 is contacted onto the side wall of the upper half member 17, ultimately yielding the same result that would arise if the tip of the spring pole 16 were secured onto the upper half member 17. As the spring pole 16 is aligned with the axis of the supporting shafts 13, the spring pole 16 will serve as an efficient spring. If the upper half member 17 is detached from the lower half member 17', the abutment portion 18 is also detached from the upper half member 17, and the spring pole 16 becomes disengaged.

To see the actuation of the lock in the process of assembly, the locking protrusion 12 is pushed inwardly by the closing movement of the cassette cap, and accordingly, the base plate 15 is pushed back pivotally around the supporting shafts 13. By the movement of the base plate 15, the spring pole 16 is bent to accumulate an elastic reactional potential. When the cassette cap is completely closed, the locking protrusion 12 is received into the locking hole formed on the cassette cap due to the reactional force of the bent spring pole 16, and the locking protrusion 12 is retained there due to the elastic strength of the spring pole 16. Thus the locked state of the cassette cap is formed. On the other hand, if the release button is pressed externally to the cassette against the elastic force of the spring pole 16, the locking protrusion 12 is taken out from the locking hole, which allows the cassette cap to open in a pivotal movement.

As described above, the device of the present invention simply comprises a base plate with a spring pole, a release button and a locking protrusion integrally formed on it. Thereby, the related interior structure of the cassette is also simplified, resulting in that the manufacturing and assembly of the cassette is greatly simplified. The device of the present invention not only shortens the required time for manual assembly, but also enables assembly by robots. Therefore, the manufacturing cost for the cassette is significantly lowered, and cheap and good quality products can be mass-produced through the use of the device of the present invention.

It should be understood that some changes and modifications can be added without departing from the scope of the attached claim.

What is claimed is:

1. A unitary lock arrangement for a video tape cassette the cassette having an upper half member and a lower half member, the lock arrangement comprising a base plate with two concentric supporting shafts extending outwardly from and rotatably mountable into slots formed in a side wall of the lower half member of the cassette, said base plate including means for releasably locking together said base plate and a cassette cap, said releasably locking together means including a locking protrusion and a release button for releasing said locking protrusion from locking engagement with the cassette cap, a spring pole extending from an upper side of said base plate between said two shafts so as to align with an axis of the two concentric supporting shafts, said spring pole having a tip from which extends an abutment portion, said abutment portion having an upper face and an end face being arranged to be contacted respectively with a ceiling and a side wall of the upper half member of the cassette, whereby stresses due to forces acting on said spring pole are evenly distributed to said concentric supporting shafts.

2. A lock arrangement according to claim 1, wherein said abutment portion has a rectangular shape with an outer surface defining said upper face and said end face.

3. A concentric lock arrangement for a video tape cassette, comprising:
a base plate having means for releasably locking said base plate and a cassette cap together, said base plate having means for releasing said releasably locking means so that said base plate and the cassette cap are unlocked from each other;
two concentric supporting shafts defining a common axis extending outward in opposite directions from said base plate; and
a spring pole extending outward from an area of said base plate into a space between said support shafts so as to align with an axis extending between said support shafts, said spring pole being elastic and having a tip from which extends an abutment portion, whereby stresses due to forces acting on said spring pole are evenly distributed to said concentric supporting shafts.

4. A lock arrangement according to claim 3, wherein said releasing means includes a release button on said base plate, said release button being pressable against an elastic force exerted by said spring pole so as to release said releasably locking means.

5. A lock arrangment according to claim 3, further comprising:
two slots formed in side walls of a lower half member of the cassette, said two supporting shafts being rotatably mounted in said two slots respectively; and
a side wall and a ceiling of an upper half member of the cassette, said abutment portion having a tip face and an upper face in contact respectively with said side wall and said ceiling of said upper half member of the cassette.

6. A lock arrangement according to claim 3, wherein said abutment portion intersects a space in alignment with said common axis.

* * * * *